United States Patent [19]

Dutchik

[11] Patent Number: 5,088,124
[45] Date of Patent: Feb. 18, 1992

[54] GLOVE AND FORM FOR MAKING SAME

[75] Inventor: Robert A. Dutchik, Valencia, Calif.

[73] Assignee: Baxter International Inc., Deerfield, Ill.

[21] Appl. No.: 614,045

[22] Filed: Nov. 7, 1990

Related U.S. Application Data

[63] Continuation of Ser. No. 262,548, Oct. 25, 1988, abandoned.

[51] Int. Cl.⁵ ............................................. A41D 19/00
[52] U.S. Cl. ............................................. 2/163; 2/168
[58] Field of Search ................... 2/163, 159, 168, 169

[56] References Cited

U.S. PATENT DOCUMENTS

| | | | |
|---|---|---|---|
| 1,206,102 | 11/1916 | Gibson | 2/159 |
| 1,279,855 | 9/1918 | Garvey | 2/168 |
| 1,931,324 | 10/1933 | Newton | 156/349 |
| 2,036,413 | 4/1936 | Herbruck | 2/168 |
| 2,266,716 | 12/1941 | Robertson | 2/163 X |
| 2,451,758 | 10/1948 | Malm | 2/168 |
| 3,283,338 | 11/1966 | Landan | 2/161 B |
| 3,601,816 | 8/1971 | Pordes et al. | 2/167 |
| 3,992,723 | 11/1976 | Lazanas | 2/161 R |
| 4,047,251 | 9/1977 | Stockum | 2/168 |
| 4,133,624 | 1/1979 | Heavner et al. | 425/275 |
| 4,135,867 | 1/1979 | Stockum | 2/168 X |
| 4,464,796 | 8/1984 | Heissenberger et al. | 2/168 |

FOREIGN PATENT DOCUMENTS

| | | | |
|---|---|---|---|
| 1202741 | 10/1965 | Fed. Rep. of Germany | 2/159 |
| 1064008 | 6/1953 | France | |
| 1191135 | 10/1959 | France | |
| 2089197 | 6/1982 | United Kingdom | 2/159 |

Primary Examiner—Werner H. Schroeder
Assistant Examiner—Sara M. Current
Attorney, Agent, or Firm—Kay H. Pierce; Paul C. Flattery

[57] ABSTRACT

A glove and glove form that has an approximately uniform profile that is thinner than conventional forms. The glove form also has a thinner profile adjacent the base of each digit and on the sides of the form adjacent the wrist. The glove has a flat front and back and a side portion connecting the front to the back. The side portion is contoured adjacent the base of the digits and on the sides of the glove adjacent the wrist.

1 Claim, 4 Drawing Sheets

GLOVE AND FORM FOR MAKING SAME

This is a continuation of application Ser. No. 7/262,548, filed on Oct. 25, 1988 and now abandoned.

BACKGROUND OF THE INVENTION

This invention relates a form for making an elastomeric glove and the glove produced by the form.

For many years gloves have been manufactured for medical and other applications by dipping a hand-shaped form into a tank of elastomeric liquid such as latex. The dipped form is then immersed in a water trough to remove water soluble impurities. Following this, the form is placed in an oven to dry and cure the glove. Once the glove is cured, it is removed from the form. This is typically a hand operation. This process of glove production is most often performed using a continuous or intermittent style conveyor for transporting the glove forms.

The process of transporting and dipping the forms at a rate suitable for production often leads to air entrapment at various places on the form, especially at the tips of the digits and at the crotch area between the digits. This trapped air can cause voids in the formed film that result in weak or thin areas on the finished glove. It has been found that the likelihood of air entrapment increases as the profile of the form leading edges become broad or blunt. It is important to design the form profile to minimize air entrapment. Most conventional porcelain forms have a broad leading edge. The nature of porcelain manufacturing can also create an irregular surface on the form, which may increase the potential for air entrapment.

In removing the glove from the form, the glove is typically grasped at the cuff end and pulled away from the form. This action causes the glove to reverse during removal. Since the elastomeric material tightens when it is cured, the glove tends to adhere to the form and to be difficult to remove. As a result, the finger tips of the glove may not be fully reversed, as shown in FIG. 4. While this does not create a problem with the use of the glove, it is undesirable from an aesthetic viewpoint.

Recently the use of gloves in the medical area has increased substantially because of the increased awareness of the spread of contagious diseases through contaminated body fluid. The market demand has increased faster than the capability of manufacturers to supply the products. It has become extremely important to maximize the production of all existing manufacturing facilities. The conventional glove forms are approximately the same size as the human hand that will wear the glove. If the thickness of the profile could be reduced, more forms could be used on existing conveyor systems. The capacity of existing facilities would be increased quickly and at a reasonable cost. Conventional porcelain forms have insulating properties that require high oven temperatures and longer dwell time to effect a proper cure. Thus a thinner profile would create new problems by significantly increasing the heating requirements in existing cure ovens.

The above problems are solved by the form and glove of the present invention.

SUMMARY OF THE INVENTION

The present invention provides a glove and glove form having an approximately uniform profile that is thinner than conventional forms. The form has thinner digit side edges and thinner side peripheral portions. These thinner portions are located on the base of each digit, the crotch between the digits and adjacent the wrist. The base of each finger adjoining the palm portion is approximately rectangular in shape with channels at each of the four corners of the finger. Toward the tip of the finger, the rectangular shape with channels blends to an elliptical configuration.

Since the glove is inverted after it is cured on the form, the glove has a shape approximately inverse to that of the form. The glove has a flat front and back connected by a side section, a portion of which is smooth and a portion of which is contoured. The contoured portion is adjacent the base of the digit surfaces and on the contoured sides of the glove from a point below the wearer's wrist to a point adjacent the base of the digit surface.

DETAILED DESCRIPTION OF THE INVENTION

Figure 1:
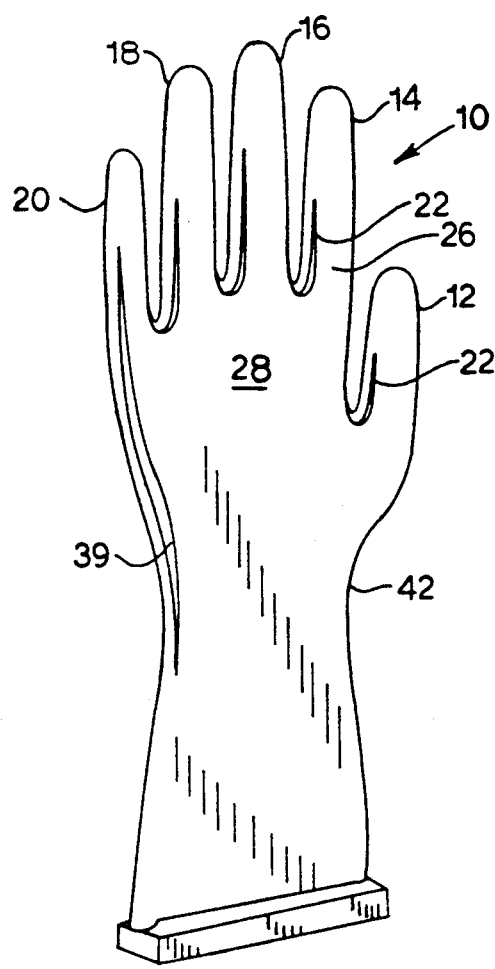
FIG. 1 is a perspective view of the front of the glove form that is the subject of this invention.
Figure 2:
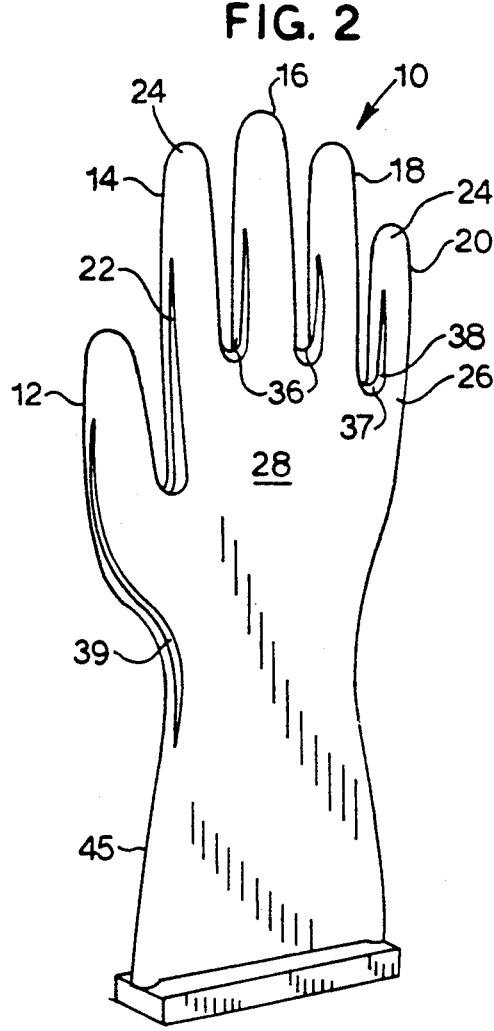
FIG. 2 is a perspective view of the back of the glove form.

FIGS. 1 and 2 show the front and back, respectively, of the glove form, generally identified as 10, of the present invention. The profile of the form is approximately ⅛ inch, except for the edges that have a reduced thickness, as will be described later. At such thin profiles, a form such as the one described herein may experience excessive warpage if the form has relatively large variations in thickness. The consistency in thickness of the present form greatly reduces the warpage or deflection of the form 10. This is especially important when subjecting the form to the high heat of the cure ovens.

To manufacture a glove of a predetermined size, it is necessary for the surface area of the form to be approximately equal to the size of the hand that will wear the glove. Thus, because the form 10 is thinner than a hand and than a conventional form, the width of the form 10 must be greater than the width of the hand to provide the correct size and fit.

Form digits 12 through 20 each have a digit side edge 22 of reduced thickness. These reduced digit side edges 22 extend from the base 26 of the finger adjacent the palm portion 28 towards the digit tips 24 which are elliptical. Approximately midway between the digit bases 26 and tips 24, the digit profile with the reduced side edges begins to blend into the elliptical shape.

Figures 8, 9:
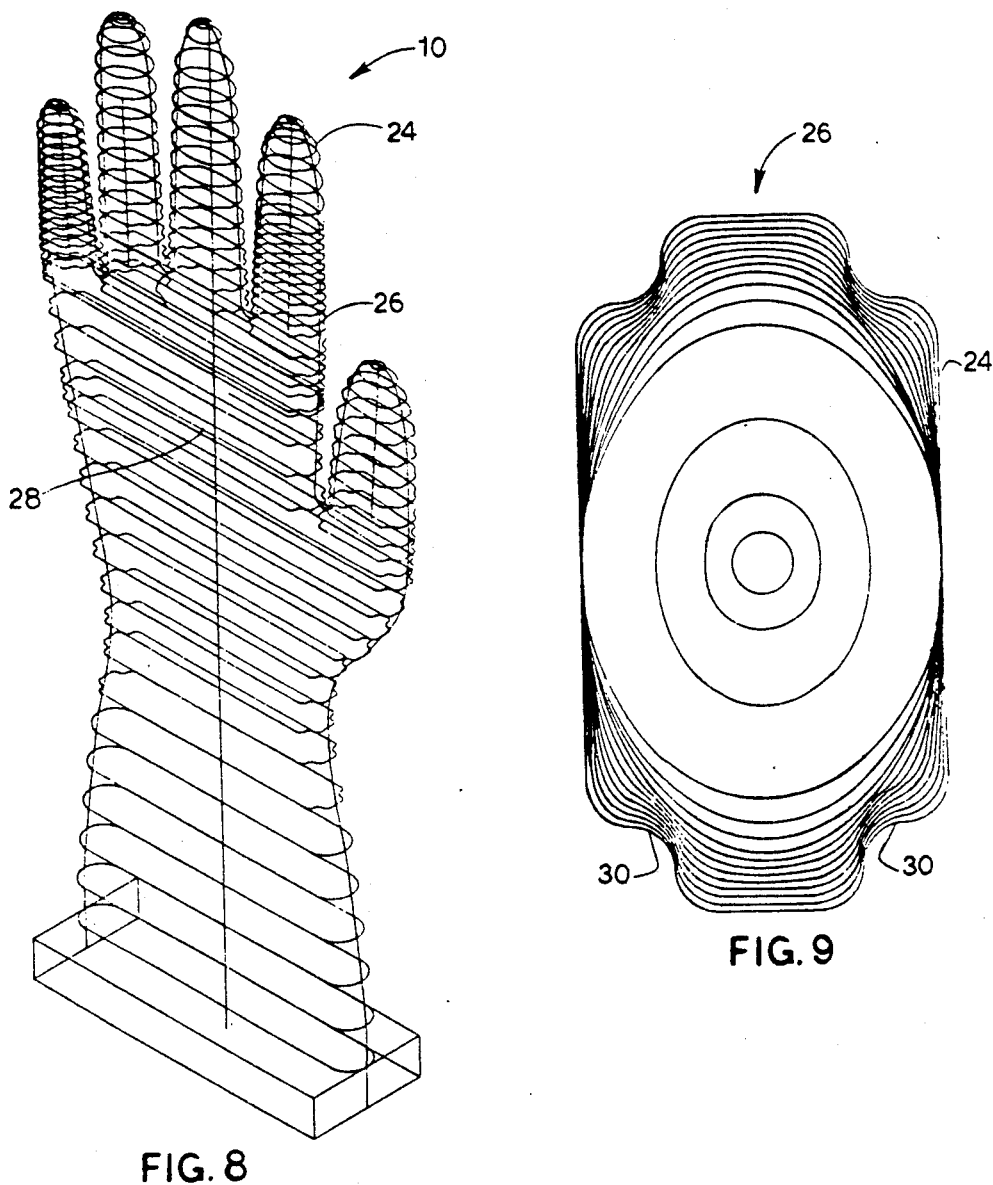
FIG. 8 is a schematic perspective view of the glove form showing the outline of the form at various cross sections.
FIG. 9 is a top view of one of the digits of the glove form depicting the change in cross sectional shape.
Figure 10:
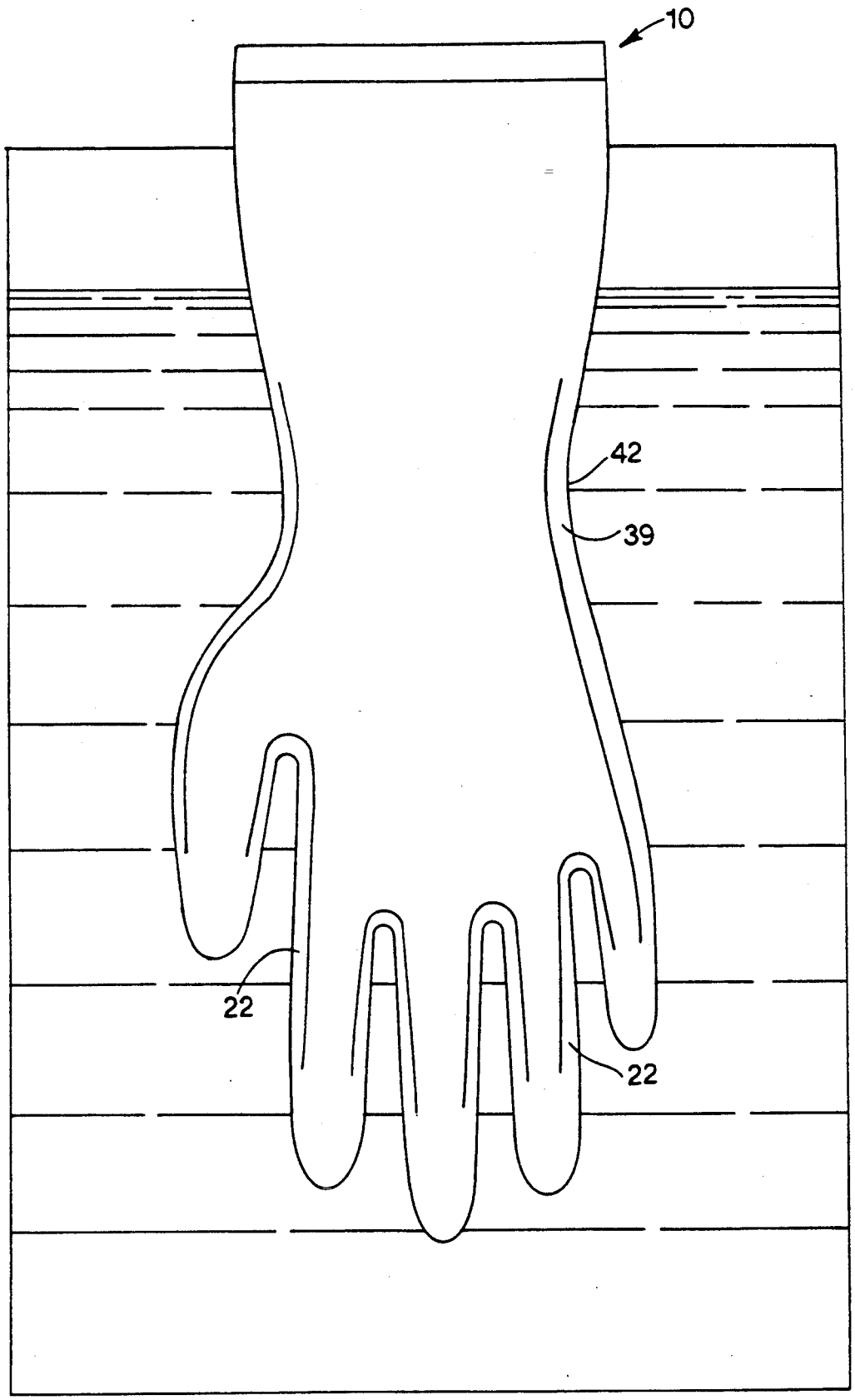
FIG. 10 is a schematic view of the glove form dipped in a vat of elastomeric liquid.

Viewing from the tip 24 of a digit, as shown in FIG. 9, the digit profile is more easily seen. The base 26 is approximately rectangular in shape with concave indentations or digit channels 30 at each of the four corners of the rectangle to form the reduced digit side edges 22. When the form 10 is dipped in the elastomeric liquid, the liquid adheres directly to the form contours. As the glove is cured, the resulting film will tend to pull away from the channels 30, forming a space between the glove and the channel. This space provides a passageway for air when air is introduced under the cuff end 32 of the glove 34.

In a manner similar to the shape of the human hand, the cross section of the glove form 10 is largest at the digit base 26 and smallest at the digit tip 24. The tips of the glove form digits are elliptical and radiused in two directions to reduce the likelihood of air entrapment when the form is dipped into the elastomeric liquid. For the same reason, the digit crotches 36 are also radiused in two directions. That is, the digit crotch is connected to the palm portion 28 by a radial surface 37 and to the digit base 26 by a radial surface 38. These features have been shown to significantly reduce glove defects.

Because the form tips 24 do not have channels 30, the glove tightly adheres to the form tips 24 when the glove cures. Before the glove is removed from the form 10, a stream of air will be directed between the glove and form, as described earlier. This separates the glove from the form 10 in the area adjacent the digit side channels so that this portion of the glove offers little resistance to being removed from the form. However, the tips of the digit pockets of the gloves tightly adhere to the form. This combination of features allows the glove finger pockets 44 to fully reverse when the glove is pulled from the form 10.

Each side of form 10 also has a thinner side peripheral portion 39. This thinner peripheral portion 39 has a concave side channel 40 on both the front and the back of the form. Each side channel begins just below the curve for the wrist 42 and extends upwards to the sides of the outer digits. When the form is dipped into the elastomeric liquid, it is submerged beyond the side channels 40 so that the cuff end is not at the form side channels 40 but is at the radiused side portion 45 of the form. This prevents leech or slurry solution from seeping between the form 10 and the glove 34.

In the same manner as described above, the film separates from the side channels 40 during the curing procedure. The air stream directed between the glove and the form 10 after the curing procedure will help separate the glove form the form to make removal of the glove easier.

The forms 10 are positioned on the continuous conveyor with a side of the glove being the leading edge into the liquid. The side channels 40, while providing for easier glove removal, also provide a thinner frontal surface for dipping thereby decreasing turbulence of the form in the elastomeric liquid. This allows for more even application of the elastomeric liquid. The thin profile of the form 10 also displaces the dipping liquid to a lesser extent than the conventional hollow porcelain forms, making it easier to maintain the proper solution level in the dip tank.

Of more significant importance, the thinner profile allows more forms to be placed on the dipping conveyor. The production of an existing facility can be expanded without incurring significant costs, such as would be incurred with the construction of additional production lines.

Conventional porcelain forms, manufactured with a thinner profile, would provide some of the benefits outlined above. However, since porcelain is an insulator, a much larger expenditure of energy would be required to heat the form and provide proper glove cure. The present invention is a form manufactured of a high temperature thermoplastic which has a higher heat transfer coefficient than porcelain. This allows the form to gain the heat required for curing at a higher rate than porcelain. The thermoplastic form requires significantly less energy to heat than a porcelain form of the same size and also cools more quickly to aid in removal of the glove.

Figure 3:
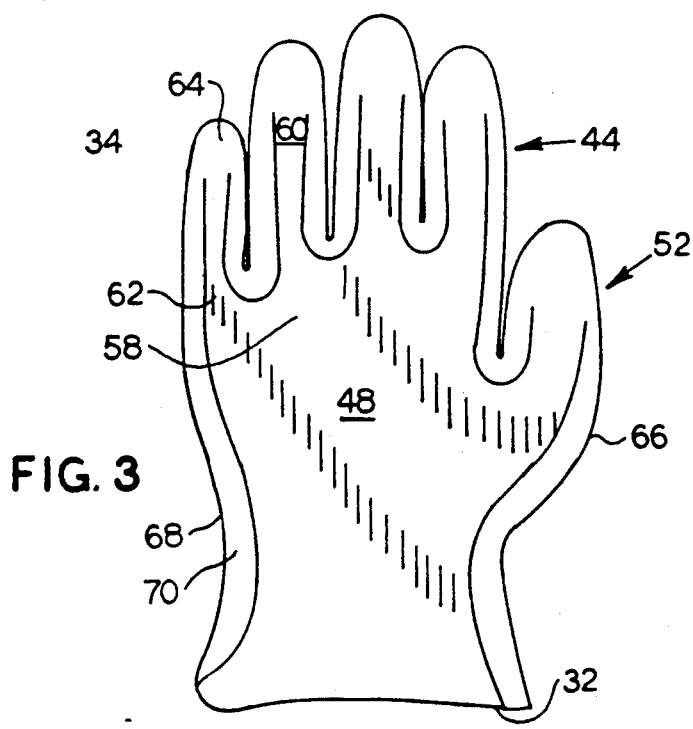
FIG. 3 is a perspective of the glove that is the subject of this invention.
Figure 4:
FIG. 4 is a perspective of a fingertip of a glove made by a prior art glove form.
Figure 5:
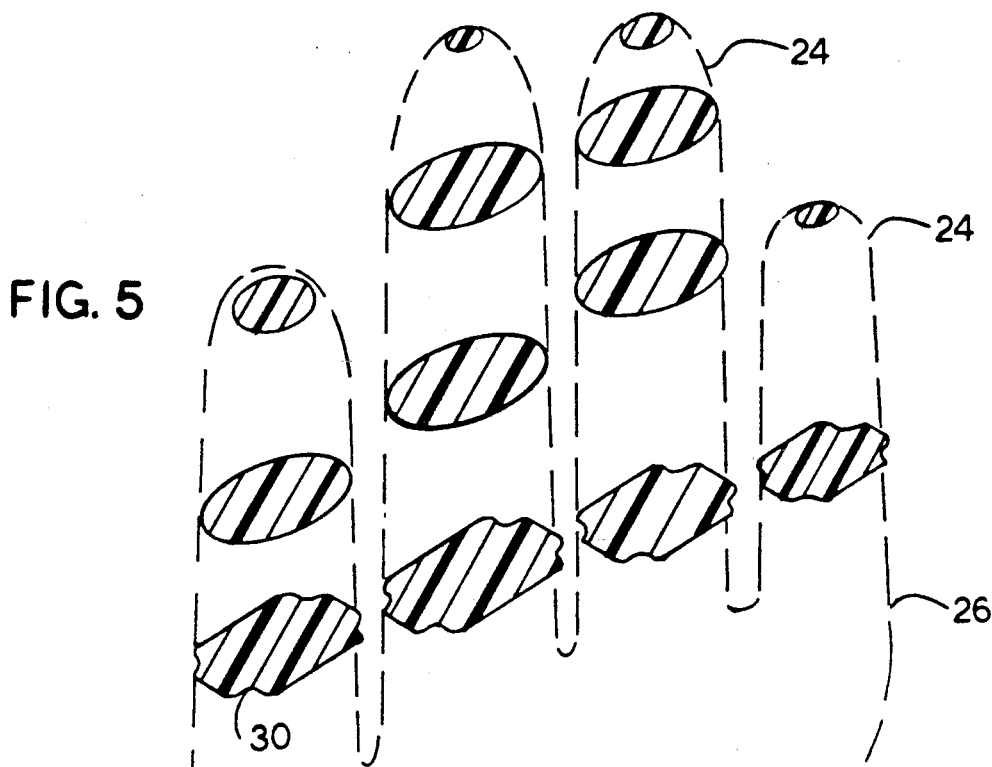
FIG. 5 is a perspective phantom view of a portion of the glove form showing cross sectional views of each of the digits.
Figure 6:
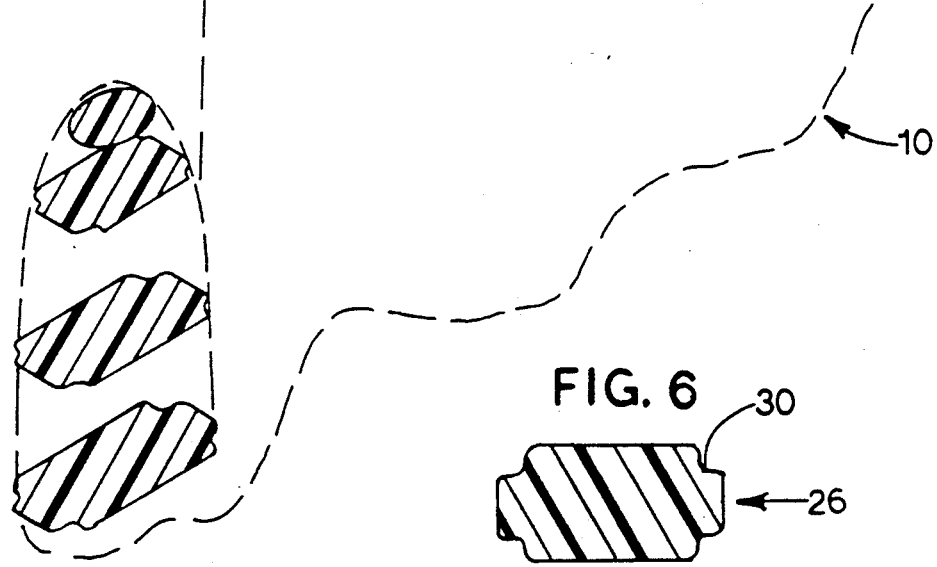
FIG. 6 is a cross sectional view of the base of one the digits of the glove form.

The glove produced by using the form described above has approximately the inverse shape of the form as shown in FIG. 3. The glove includes a front 48 and a back (not shown) which is substantially a mirror image of the front. Both the front 48 and the back are substantially flat, each having a palm surface 58, five digit surfaces 60 and a periphery 66. Each of the digit surfaces has a base 62 by which it is connected to a palm surface 58 and a tip 64 spaced distally from the palm surface 58. The front 48 and back are connected at their peripheries by a side section, a portion of which is smooth 68 and a portion of which is contoured 70. The contoured portion 70 results from the part of the glove form that has the thinner digit side edges 22 or thinner side peripheral portion 39. The smooth portion 40 results from the part of the glove form that has no reduced cross section.

Figure 7:
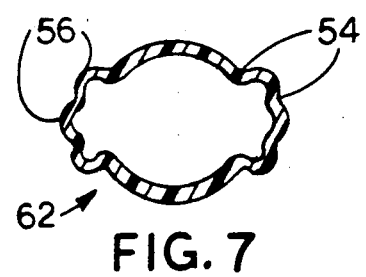
FIG. 7 is a cross sectional view of the base of one of the digit pockets of the glove.

The concave digit channels 30 and side channels 40 of the form become convex portions when the glove is removed from the form and inverted. Thus the glove is flat across the front 48 and back and rounded on the sides of the finger pockets 44 and side edges 52 of the glove. The finger pockets 44 take on a more circular configuration as compared to the flatness of the form 10. FIG. 7 shows a close-up view of the cross section of one of the fingers of the glove. The rounded finger pocket sides 44 and rounded side edges 50 are actually comprised of four concave portions 54 alternated with three convex portions 56.

While the invention has particularly been shown and described with reference to a preferred embodiment, it will be understood by those skilled in the art that variation in form, construction and arrangement may be made therein without departing from the spirit and scope of the invention.

I claim:

1. A glove, comprising:
   a front surface (48)
   a back surface, said back surface being substantially a mirror image of said front surface,
   both said front and back surfaces being substantially flat, each of said front and back surfaces having a palm surface (58), five digit surfaces (60), and a periphery (66),
   each of said digit surfaces having a base (62) by which each of said digit surfaces is connected to said palm surface,
   each of said digit surfaces also having a tip portion (64) spaced distally from said palm surface (58);
   a side section connecting said periphery of said front surface to said periphery of said back surface,
   said side section having four concave portions (54) alternated with three convex portions (56) that extend substantially along said side section between said periphery of said front and back surfaces except along said periphery adjacent each of said tip portions.

* * * * *